US007059649B2

(12) United States Patent
Kuan et al.

(10) Patent No.: US 7,059,649 B2
(45) Date of Patent: Jun. 13, 2006

(54) POWER-OPERATED VEHICLE TRUCK DECKLID

(75) Inventors: Chihping Kuan, Rochester Hills, MI (US); Joseph Benjamin Saxon, Cookeville, TN (US); Shelley Lynn Bolbrugge, Royal Oak, MI (US); Adam Kyle Cramton, Royal Oak, MI (US); Enrico Fin, Lake Orion, MI (US); Jack R. Roach, Florence, SC (US); Karim Dayoub, Royal Oak, MI (US); Walter Douglas Bauman, Wixom, MI (US)

(73) Assignee: Arvin Technologies, Inc., Columbus, IN (US)

( * ) Notice: Subject to any disclaimer, the term of this patent is extended or adjusted under 35 U.S.C. 154(b) by 0 days.

(21) Appl. No.: 10/950,270

(22) Filed: Sep. 24, 2004

(65) Prior Publication Data

US 2006/0066125 A1 Mar. 30, 2006

(51) Int. Cl.
*B62D 25/10* (2006.01)

(52) U.S. Cl. .......................................................... 296/76

(58) Field of Classification Search .................. 296/76
See application file for complete search history.

(56) References Cited

U.S. PATENT DOCUMENTS

| | | | | | |
|---|---|---|---|---|---|
| 4,903,435 | A * | 2/1990 | Bittmann et al. | ............. | 49/340 |
| 5,531,498 | A | 7/1996 | Kowall | | |
| 5,588,258 | A | 12/1996 | Wright et al. | | |
| 5,896,703 | A | 4/1999 | Wright et al. | | |
| 6,092,336 | A | 7/2000 | Wright et al. | | |
| 6,098,490 | A | 8/2000 | Kowalewski et al. | | |
| 6,135,514 | A | 10/2000 | Kowalewski et al. | | |
| 6,454,339 | B1 * | 9/2002 | Wilde et al. | .................. | 296/76 |

* cited by examiner

*Primary Examiner*—Dennis H. Pedder
(74) *Attorney, Agent, or Firm*—Carlson, Gaskey & Olds

(57) ABSTRACT

A power mechanism for opening and closing a vehicle trunk decklid includes power-operated guides that move the linkages on the decklid. The guides are moved by push-pull cables operated by a motor and disposed in a guide rail located in a trunk sill. The motor may be controlled by a controller that receives a user signal and operates the motor based on the signal.

20 Claims, 3 Drawing Sheets

POWER-OPERATED VEHICLE TRUCK DECKLID

TECHNICAL FIELD

The present invention is directed to vehicle trunk decklids, and more particularly to a powered mechanism for opening and closing a vehicle decklid.

BACKGROUND OF THE INVENTION

Currently known vehicle trunk decklids are opened and closed manually. This manual operation is often inconvenient, particularly when attempting to load a trunk, because the user requires at least one hand to unlock and open the decklid. If both of the user's hands are occupied, this requires the user to set down the items being held before opening the decklid. In inclement weather, the time required to manually open and close the decklid creates further inconvenience. Further, some decklids may be too heavy for a user to operate comfortably. Thus, the user may require assistance to open and close the decklid.

Further, there is currently no way for a user to control how far the decklid is raised or lowered, making it impossible for the decklid to be positioned anywhere other than a fully open or fully closed position. As a result, if the decklid is opened in the rain, there is no way to keep the decklid at a partially open position to shield the trunk contents from water.

There is a desire for a system that can provide powered assistance or full operation in opening and closing a vehicle trunk decklid.

There is also a desire for a system that allows greater control over the decklid position.

SUMMARY OF THE INVENTION

The present invention is directed to a power mechanism for opening and closing a vehicle trunk decklid. In one embodiment, linkages on the decklid hinges are connected to power-operated guides that move the linkages, thereby moving the decklid. The guides are moved by push-pull cables operated by a motor and disposed in a guide rail located in a trunk sill. The motor may be controlled by a controller that receives a user signal and operates the motor based on the signal.

The power mechanism therefore provides powered operation of the decklid using existing hinge structures and a configuration that can be easily incorporated into a vehicle without requiring extensive modification of existing vehicle designs.

DETAILED DESCRIPTION OF THE EMBODIMENTS

Figure 1:
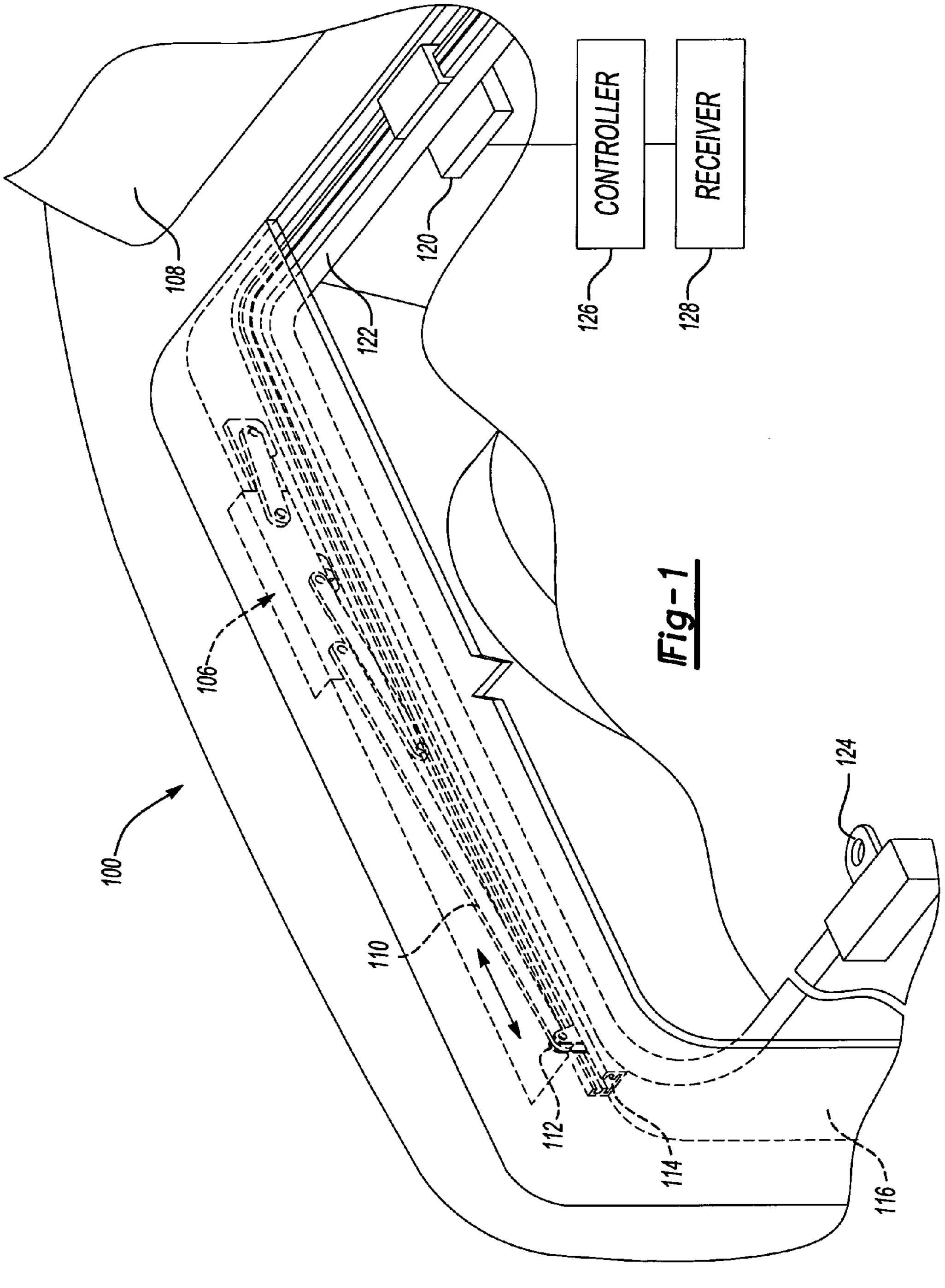
FIG. 1 is a representative perspective view of a decklid system according to one embodiment of the invention when a decklid is in a closed position.

Generally, the invention is directed to a power mechanism for opening and closing a vehicle trunk decklid, thereby reducing or eliminating the force needed to open and close the decklid manually. FIGS. 1 through 4 illustrate one embodiment of a vehicle trunk decklid system 100 according to one embodiment of the invention. In the illustrated embodiment, a decklid 102 is connected to a vehicle by four-bar hinges 106, which swing the decklid 102 away from a rear window 108 as well as upward when the decklid 102 is opened. Of course, any other compatible hinge mechanism, such as a gooseneck hinge, may be used in the system 100 without departing from the invention.

The hinges 106 each include a linkage 110 that provides the forward/backward movement of the decklid 102. Each linkage 110 is attached to a guide 112 that moves along a U-shaped guide rail 114 disposed in a trunk sill 116 of the vehicle.

Push-pull cables 118 are disposed within the guide rail 114 and are driven by a motor 120. In the illustrated embodiment, the motor 120 is disposed close to the rear window 108 in a base portion 122 of the guide rail 114, but the motor 120 can be placed in any appropriate location. The cable 118 engages with gears in the motor 120 so that as the motor 120 turns, the cables 118 are pushed or pulled in a given direction, depending on the motor's rotational direction.

The guides 112 engage with the push-pull cables 118 so that movement of the cable 118 moves the guides 112 along the rail 114. In one embodiment, the system 100 includes a pair of cables 118, each cable 118 associated with one of the guides 112. As the motor 120 turns, the cable pair is driven so that the guides 112 move along leg portions of the guide rail 114. The cables 118 may be connected to the motor 120 so they are actuated by a singular pinion in opposing directions. In one embodiment, each cable 118 is long enough to push the guides 112 to their fullest extent and are pushed and pulled at the same time.

Figure 2:
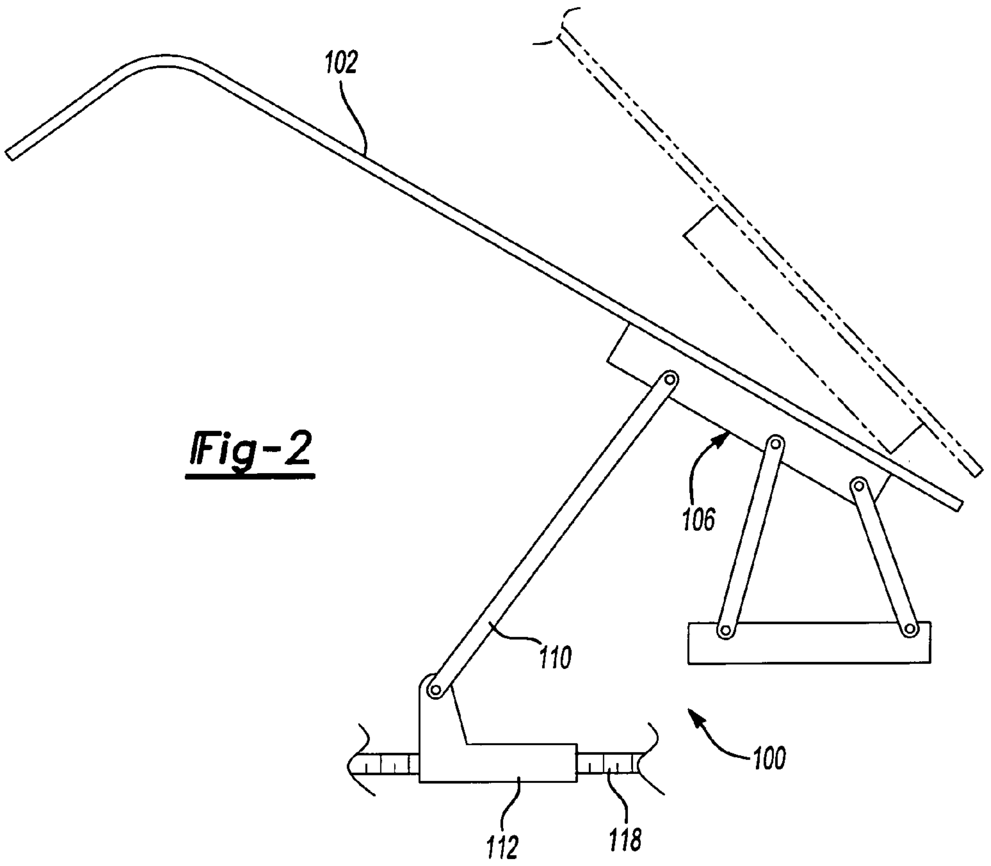
FIG. 2 is a representative side view of the decklid in FIG. 1.
Figure 4:
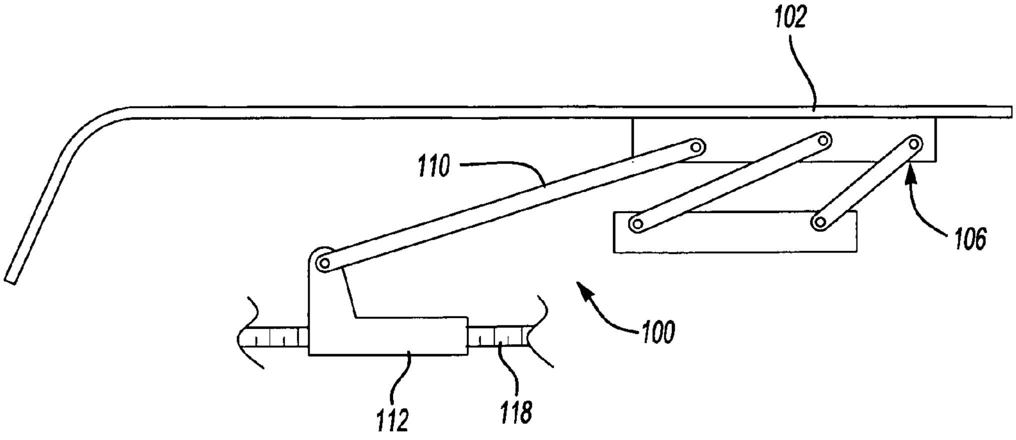
FIG. 4 is a representative side view of the decklid in FIG. 2.
Figure 3:
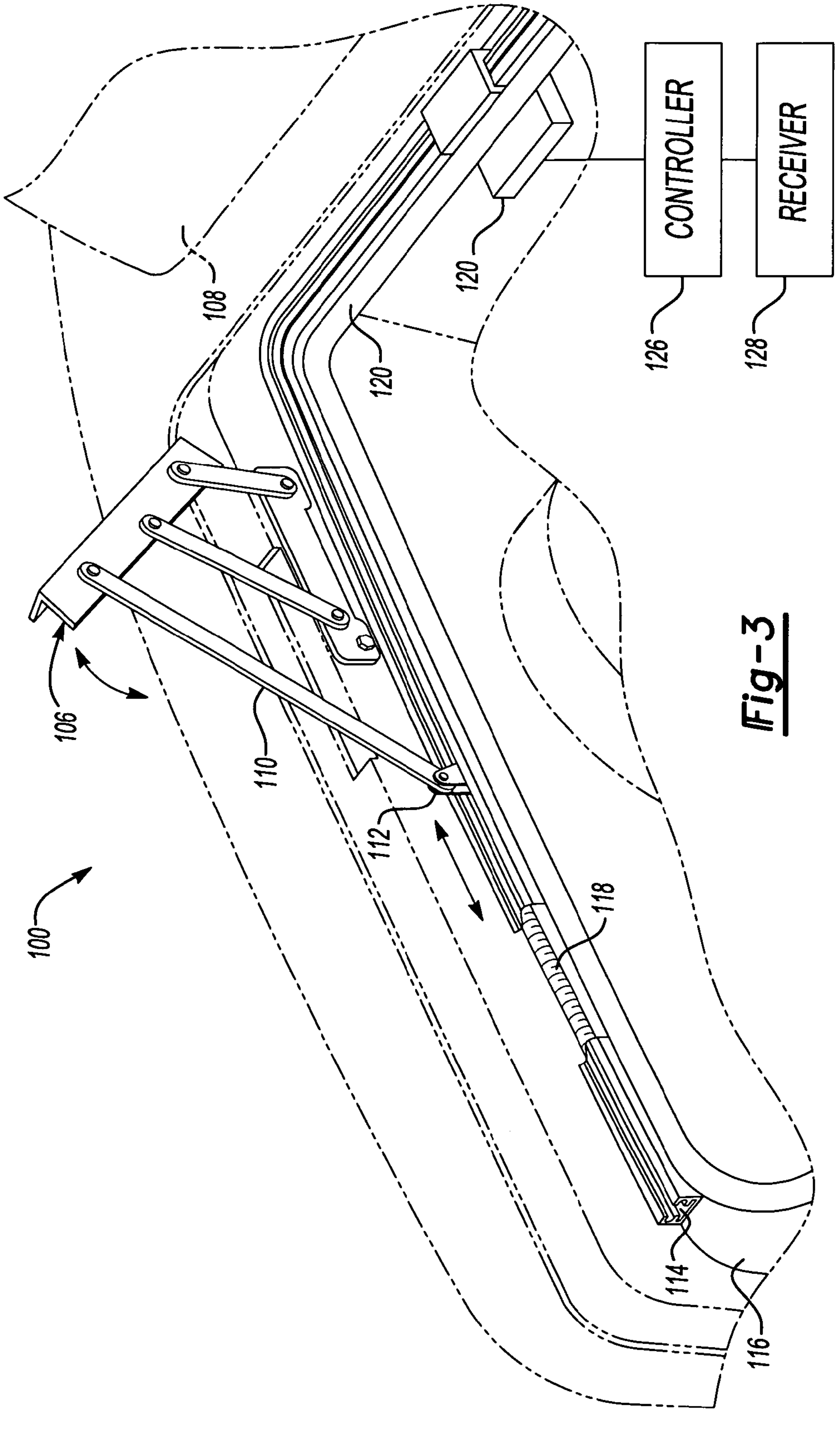
FIG. 3 is a representative perspective view of the decklid system when the decklid is in an open position.

As the guides 112 are driven by the push-pull cables 118, they move either forward or backward in the guide rail 114, depending on the rotational direction of the motor 120. When the guides 112 are pulled, the loose ends of each cable 118 follow around the guide rail 114. The movement of the guides 112 causes their corresponding linkages 110 in the hinges 106 to move as well, pushing the decklid 102 open or pulling the decklid 102 closed. Because the linkages 110 bear the full weight of the decklid 102 as it moves the decklid 102, the linkages 110 may be reinforced to absorb these forces. As can be seen in FIGS. 2 and 4, the orientation of the linkage 110 controls whether the decklid 102 is open or closed.

A cinching latch 124 may be included in place of a conventional latch to pull the decklid 102 completely closed when it reaches a predetermined closed position. This allows the motor 120 to be kept relatively small so that it does not have to apply additional force to cinch the decklid 102 closed. As is known in the art, the cinching latch 124 grabs a bar on the decklid 102 when the decklid 102 reaches a closed position and then pulls the decklid 102 tightly against a seal (not shown) into a completely closed position. This allows the system 100 to completely close the decklid 102 without requiring any manual intervention by the user.

To further refine the operation of the system 100, the motor 120 may be controlled by a controller 126, which receives user signals and controls motor operation based on those signals. In one embodiment, the controller can be housed in the electronics of the motor 120 and operate the motor 120 in response to a simple switching signal from a switch in the passenger cabin and/or a key fob. For example, the controller 126 may receive a signal from a passenger compartment switch and start the motor 120 to open or close the decklid 102 in response to the switch signal. The controller 126 may even stop and start the motor 120 depending on, for example, the length of time that the switch is held in a given position, providing control over the position of the decklid 102 in between the open and closed positions. The controller 126 may include a receiver 128 that receives a remote operating signal from a user via a key fob. This allows the decklid to be opened/closed remotely if desired.

As a result, the inventive powered decklid system provides powered opening and closing of a decklid, making the decklid more convenient to operate. Using guide rails, guides, and push-pull cables allows powered decklid operation using existing hinge structures and also provides a compact profile, making it easy to incorporate the inventive system into an existing trunk structure with little modification to the structure itself.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A power mechanism that opens and closes a vehicle trunk decklid, comprising:

a motor;

at least one guide operable by the motor;

a guide rail that guides movement of said at least one guide;

a linkage that operably connects said at least one guide to a decklid; and at least one cable that connects said at least one guide to said motor, wherein operation of said motor moves said at least one cable to move said at least one guide, and wherein said at least one cable is a push-pull cable.

2. The power mechanism of claim 1, wherein the linkage comprises a plurality of link bars.

3. A power mechanism that opens and closes a vehicle trunk decklid, comprising:

a motor;

at least one guide operable by the motor;

a guide rail that guides movement of said at least one guide; and a linkage that operably connects said at least one guide to a decklid wherein said at least one guide comprises two guides, and wherein said guide rail is a substantially U-shaped guide rail having two leg portions, each leg portion guiding one of said two guides.

4. The power mechanism of claim 3, wherein the two leg portions are substantially parallel.

5. The power mechanism of claim 1, wherein said at least one cable comprises two cables and said at least one guide comprises two guides, each guide operated by one of said two cables.

6. The power mechanism of claim 1, further comprising a controller that controls operation of the motor based on a user signal.

7. The power mechanism of claim 6, wherein the controller includes a receiver that receives a remote operating signal as the user signal.

8. The power mechanism of claim 6, wherein the controller allows the decklid to stop in a position between an open position and a closed position.

9. The power mechanism of claim 1, further comprising a cinching latch to pull the decklid to a completely closed position.

10. A power mechanism that opens and closes a vehicle trunk decklid, comprising:

a motor;

at least two guides operable by the motor;

a substantially U-shaped guide rail that guides movement of said at least one guide, the U-shaped guide rail having two leg portions, each leg portion guiding at least one of said at least two guides;

a push-pull cable assembly disposed in the U-shaped guide rail, wherein said push-pull cable assembly connects said at least two guides to the motor such that operation of the motor moves said push-pull cable assembly to move said at least two guides;

a hinge including a linkage that operably connects said at least one guide to a decklid; and a controller that controls operation of the motor based on a user signal.

11. The power mechanism of claim 10, wherein the two leg portions are substantially parallel.

12. The power mechanism of claim 10, wherein said push-pull cable assembly comprises two push-pull cables, each of said at least two guides operated by one of said two push-pull cables such that said at least two guides are horizontally aligned with each other.

13. The power mechanism of claim 10, wherein the controller includes a receiver that receives a remote operating signal as the user signal.

14. The power mechanism of claim 10, wherein the controller allows the decklid to stop in a position between an open position and a closed position.

15. The power mechanism of claim 10, further comprising a cinching latch to pull the decklid to a completely closed position.

16. A power mechanism that controls movement of a decklid, comprising:

a motor;

at least one guide operable by the motor;

a guide rail that guides movement of said at least one guide;

a linkage assembly operably connecting said at least one guide to the decklid, said linkage assembly comprising a link bar that is coupled to the decklid; and a push-pull cable assembly driven by said motor to move said at least one guide.

17. The power mechanism of claim 16 wherein said guide rail comprises a U-shape.

18. The power mechanism of claim 16 wherein said at least one guide comprises first and second guides and wherein said cable assembly comprises a first cable coupled to said first guide and a second cable coupled to said second guide.

19. The power mechanism of claim 16 wherein said cable assembly comprises a push-pull cable.

20. The power mechanism of claim 16 wherein multiple link bars are directly coupled to the decklid.

* * * * *

UNITED STATES PATENT AND TRADEMARK OFFICE

CERTIFICATE OF CORRECTION

PATENT NO. : 7,059,649 B2
APPLICATION NO. : 10/950270
DATED : June 13, 2006
INVENTOR(S) : Chihping Kuan et al.

It is certified that error appears in the above-identified patent and that said Letters Patent is hereby corrected as shown below:

In Section (54) on the front page, please correct the title to:

POWER-OPERATED VEHICLE TRUNK DECKLID

Signed and Sealed this

Twenty-first Day of November, 2006

JON W. DUDAS
*Director of the United States Patent and Trademark Office*